US005701414A

United States Patent [19]

Cheng et al.

[11] Patent Number: 5,701,414

[45] Date of Patent: Dec. 23, 1997

[54] CONTROLLER FOR SELECTIVE CALL RECEIVER HAVING MEMORY FOR STORING CONTROL INFORMATION, PLURALITY OF ADDRESSES, STATUS INFORMATION, RECEIVE ADDRESS INFORMATION, AND MESSAGE

[75] Inventors: Yiu-Wah Eric Cheng, Taipei; Wei-Jen Jim Du, Tainan County; Shou-Yuan Richard Huang, Chung Ho, all of Taiwan

[73] Assignee: Motorola, Inc., Schaumburg, Ill.

[21] Appl. No.: 491,691

[22] Filed: Jun. 19, 1995

[51] Int. Cl.[6] .......... G06F 13/00

[52] U.S. Cl. .......... 395/200.09; 340/825.44

[58] Field of Search .......... 395/200.03, 200.08, 395/200.09, 200.2; 340/825.37, 825.44, 825.52, 825.53; 455/89, 38.3, 343

[56] References Cited

U.S. PATENT DOCUMENTS

| | | | |
|---|---|---|---|
| 4,816,996 | 3/1989 | Hill et al. | 395/825 |
| 4,958,277 | 9/1990 | Hill et al. | 395/872 |
| 5,225,826 | 7/1993 | DeLuca et al. | 340/825.44 |
| 5,272,475 | 12/1993 | Eaton et al. | 340/825.44 |
| 5,303,227 | 4/1994 | Herold et al. | 370/276 |
| 5,309,483 | 5/1994 | Oliboni et al. | 375/355 |
| 5,311,516 | 5/1994 | Kuznicki et al. | 370/314 |
| 5,374,925 | 12/1994 | Ohkuma | 340/825.44 |
| 5,418,529 | 5/1995 | De Luigi et al. | 340/825.44 |
| 5,423,086 | 6/1995 | Cannon et al. | 455/186.1 |
| 5,426,424 | 6/1995 | Vanden Heuvel et al. | 340/825.44 |
| 5,455,572 | 10/1995 | Cannon et al. | 340/825.44 |
| 5,463,383 | 10/1995 | Pache | 340/825.44 |
| 5,495,234 | 2/1996 | Capp et al. | 340/825.21 |
| 5,512,886 | 4/1996 | Macko et al. | 340/825.07 |

*Primary Examiner*—Moustafa M. Meky
*Attorney, Agent, or Firm*—Robert D. Atkins

[57] ABSTRACT

A memory 220 comprising address register 305, control register 310, status register 315, message register 320, and receive address register information register 325, are coupled to a decoder 240 and a microcontroller 250 via a parallel bus 235 and 230. The microcontroller 250 controlling the operation of the decoder 240 to receive and decode a selective call signal from the receiver circuitry 102, the microcontroller 250 communicating with the decoder 240 by storing and retrieving information in the registers in the memory 220. The decoder 240 communicating with the microcontroller 240 by storing and retrieving information in the registers in the memory 220.

13 Claims, 5 Drawing Sheets

-PRIOR ART-

200

CONTROLLER FOR SELECTIVE CALL RECEIVER HAVING MEMORY FOR STORING CONTROL INFORMATION, PLURALITY OF ADDRESSES, STATUS INFORMATION, RECEIVE ADDRESS INFORMATION, AND MESSAGE

FIELD OF THE INVENTION

This invention relates in general to controllers, and in particular to a method and apparatus for integrating a dedicated selective call decoder in a controller of a selective call receiver.

BACKGROUND OF THE INVENTION

Selective call receivers are portable communication devices that are known in the art. As with all portable communication devices, it is desirable for a selective call receiver to be small in size, and have long battery life. To reduce the size and increase the battery life of a selective call receiver, a primary objective is to reduce the number of electronic components in the selective call receiver.

Presently, two essential components used in a selective call receiver are a decoder and a microcontroller. The decoder is typically a dedicated component, purchased on the open market that decodes a selective call signal in accordance with a predetermined protocol. The microcontroller performs several functions, including providing a user interface, driving an LCD display, and interfacing with the decoder. These two components coupled by a serial communication link is the conventional approach to designing a compact selective call receiver.

Currently, there are growing demands for smaller, more compact, selective call receivers. However, the two component combination limits the size to which a selective call receiver may be reduced, and limits the battery life. Integrating the decoder and the microcontroller into a single semiconductor package would provide a smaller solution. However a primary difficulty with this approach is that the decoder and the microcontroller each communicate information internally in parallel, while externally the decoder and the microcontroller conventionally communicate serially via a standard serial interface such as the serial peripheral interface (SPI) standard. This results in several disadvantages. For example, input-output ports of the microcontroller which could be used for other functions in the selective call receiver are required to support serial communication.

Hence, the single chip could not support any additional functionality. Also the slow microcontroller response time to incoming messages. This is because, several transfers are required to transfer an incoming message from the decoder to the microcontroller via the serial communication link. Another example is quantity of software required, and consequently the memory to store the software for controlling the serial communication between the microcontroller and the decoder. And also, the duplication of circuitry in the decoder and the microcontroller to support serial communication.

Hence, there is a need for an apparatus that integrates a decoder and a microcontroller in a single semiconductor package, which will provide input and output microcontroller pins for added functionality, will reduce response time to incoming messages, will not require a large amount of memory, and will not require duplicate circuitry in the decoder and the microcontroller.

SUMMARY OF THE INVENTION

In carrying out the objects of the present invention in one form, there is provided a controller for a selective call receiver having a plurality of addresses, and wherein the selective call receiver receives a selective call signal having one of the plurality of addresses and a message, the controller comprising: a microcontroller for providing control information and the plurality of addresses, and for retrieving status information, receive address information and the message; a memory coupled to the microcontroller for storing the control information and the plurality of addresses from the microcontroller, and for storing the status information, the receive address information, and the message for retrieval by the microcontroller; and a decoder for retrieving the control information from the memory, for receiving and decoding the selective call signal in accordance with the control information in response to receiving the selective call signal, for storing the status information in the memory when receiving and decoding the selective call signal, for storing the receive address information in the memory in response to detecting the one of the plurality of addresses in the selective call signal, and for decoding and storing the message in the memory.

DETAILED DESCRIPTION OF THE INVENTION

Figure 1:
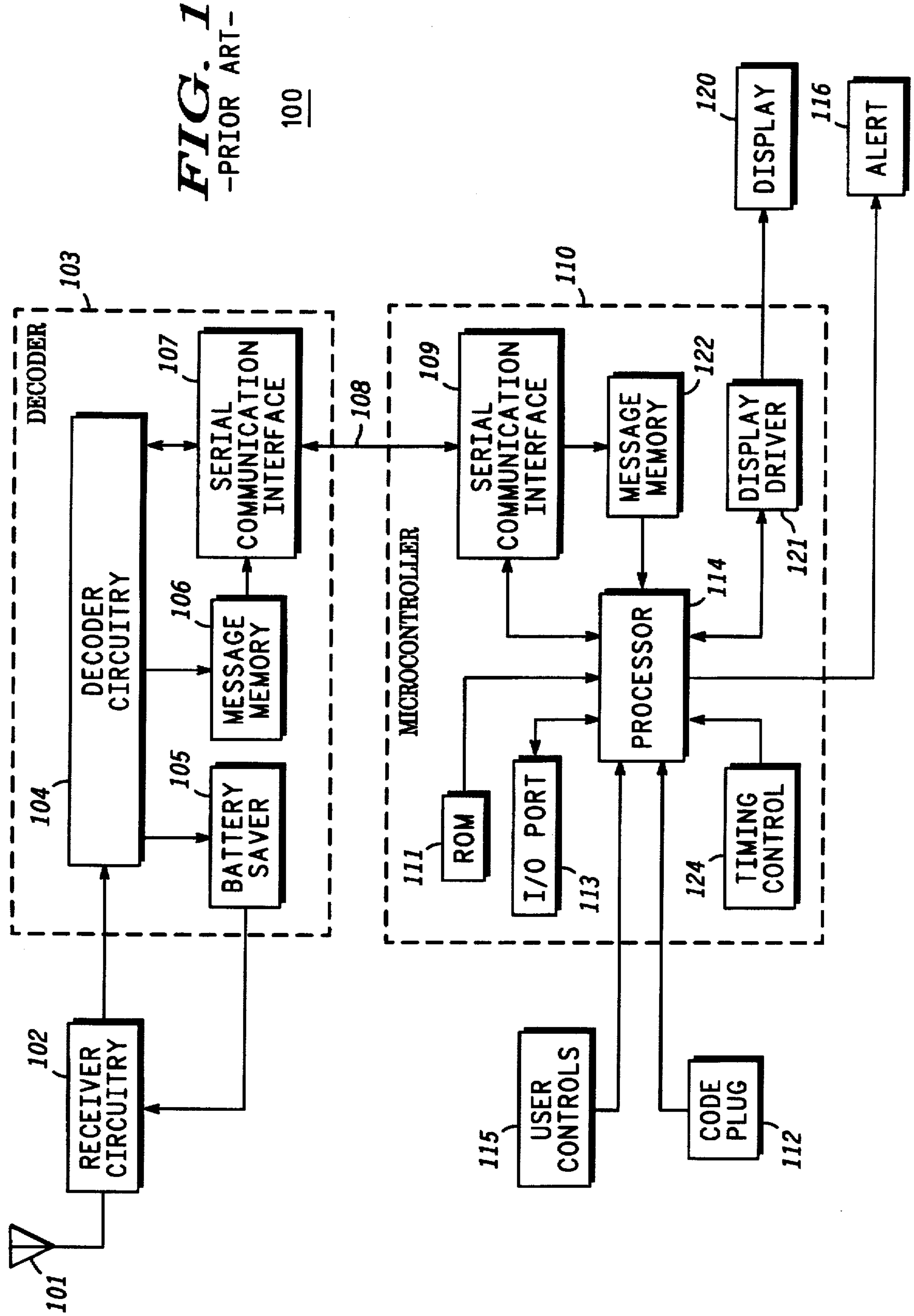
FIG. 1 illustrates a selective call receiver known in the prior art.

FIG. 1 illustrates a selective call receiver 100 known in the prior art for receiving and decoding a selective call signal. The selective call receiver 100 comprises two essential components, a serial decoder chip 103 and a serial microcontroller 110 chip, each chip independently designed to support serial communication. The decoder 103 and the microcontroller 110 are individually packaged semiconductor chips available on the open market that support a serial communication standard, such as the serial peripheral interface (SPI) standard, conventionally adopted by manufacturers of both the decoder 103 and the microcontroller 110 chips. Conventionally, a serial interface provides an economical and practical interface for the decoder and microcontroller chip manufacturers, as well as for selective call receiver manufacturers. Adopting a serial standard allows selective call receiver manufactures to conveniently couple the microcontroller and decoder chips from different chip manufacturers. And, for semiconductor chip manufacturers a serial interface is desirable because it requires a small number of pins which result in lower packaging costs. The decoder 103 comprises decoder circuitry 104 which is coupled to the receiver circuitry 102, battery saver 105 which is coupled to the decoder circuitry 104 and receiver circuitry 102, message memory 106 which is coupled to the decoder circuitry 104 and serial communication interface 107, and the serial communication interface 107 is also coupled to the decoder circuitry 104. The microcontroller 110 comprises read only memory (ROM) 111, input/output port 113, display driver 121, message memory 122, timing control 124, and serial communication interface 109, where are coupled to processor 114. In addition, the processor 114 is coupled to user controls 115, code plug 112 and alert 116, the serial communication interface 109 is coupled to the message memory 122, and the display driver is coupled to a display 120. The microcontroller 110 and the decoder 103 communicate via serial communication interface 109, serial communication link 108 and serial communication interface 107, which shall be collectively referred to as the serial bus from this point onwards. The microcontroller 110 controls the operation of the selective call receiver 100. This is accomplished by the processor 114, driven by the timing input from the timing control 124, executing predetermined instructions stored in the ROM 111. Prior to the selective call receiver 100 receiving a selective call signal, for example after power in the selective call receiver 100 is turned ON or after reset, the processor 114 initialises or prepares the selective call receiver for receiving and decoding the selective call signal. During the initialisation, the processor 114 retrieves control information from the ROM 111 and selective call addresses of the selective call receiver from the code plug 112, and transmits the retrieved control information and the retrieved selective call addresses via the serial bus to the decoder circuitry 104. The control information programs the decoder circuitry 104, and the selective call addresses are stored in the decoder circuitry 104. When the receiver circuitry 102 receives a selective call signal modulated on a radio frequency carrier via the antenna 101, the received selective call signal is demodulated by the receiver circuitry 102 and provided to the decoder circuitry 104. The decoder circuitry 104 receives and decodes the selective call signal from the receiver circuitry 102 in accordance with the control information provided by the processor 114. When the decoder circuitry 104 detects at least one of the addresses provided from the code plug 112 in the received selective call signal when decoding the received selective call signal, the decoder circuitry 104 continues to decode a message in the selective call signal associated with the detected address, and stores the decoded message in the message memory 106. When receiving and decoding the selective call signal, the decoder circuitry 104 communicates status information to the processor 114 via the serial bus. The processor 114, in response to receiving the status information may transmit additional control information to the decoder circuitry 104. Alternatively, the decoder 103, in accordance with the control information provided from the processor 114, can generate one or more interrupts when the status information indicates predetermined conditions. The interrupt is transmitted via a dedicated output of the decoder 104 to the I/O port 113 of the microcontroller 110. Thus, using up the limited I/O ports of the microcontroller 110. In response to receiving the interrupt, the processor 114 gets the status information from the decoder circuitry 104, and continues processing a received selective call signal in accordance with the status information. Several transmissions of control information and status information occur between the processor 114 and the decoder circuitry 104 via the serial bus when receiving and decoding the selective call signal. This causes the processor 114 to spend a substantial portion of its processing resources servicing the serial communication interface 109. Subsequently, the message stored in the message memory 106 is transmitted to the microcontroller 110 via the serial bus and stored in message memory 122. The processor 114 then activates the alert 116, and in response to detecting a user input via the user controls 115, the processor 1114 provides the message from the message memory 122 to the display driver 121 which presents the message to a user. In addition, the decoder circuitry 104 also transmits receive address information to the processor 114 via the serial bus, wherein the receive address information indicates which of the addresses provided from the code plug 112 was detected in the selective call signal. When the received selective call does not include any of the addresses provided from the code plug 112, the decoder circuitry 104 also provides an input to the battery saver 105. The battery saver 105, in response to the input from the decoder circuitry 104, transmits a battery saver signal to the receiver circuitry 102 causing the receiver circuitry 102 to reduce its current drain, thereby saving power.

From the preceding description, a significant amount of information is communicated between the decoder chip and the microcontroller chip, and although both these chips communicate information internally in parallel, externally they communicate serially which is considerably slower. Thus, serial communication between the decoder and the microcontroller significantly restricts the performance of a selective call receiver. A second disadvantage is the microcontroller response time to incoming messages. This is because, a received message is communicated in a serial stream of bits from the decoder to the microcontroller via the serial bus. The third disadvantage is the software required, and consequently the memory to store the additional software, to control the serial transfer of information on the serial bus. A fourth disadvantage is the duplication of circuitry in the decoder and the microcontroller to support the serial bus, such as the message memory. And a fifth disadvantage is the input-output ports of the microcontroller which could be used for other functions in the selective call receiver are required to support serial communication, such as handshaking and for receiving interrupts from the decoder. Hence, I/O ports are not available to support additional functionality in a selective call receiver.

Figure 2:
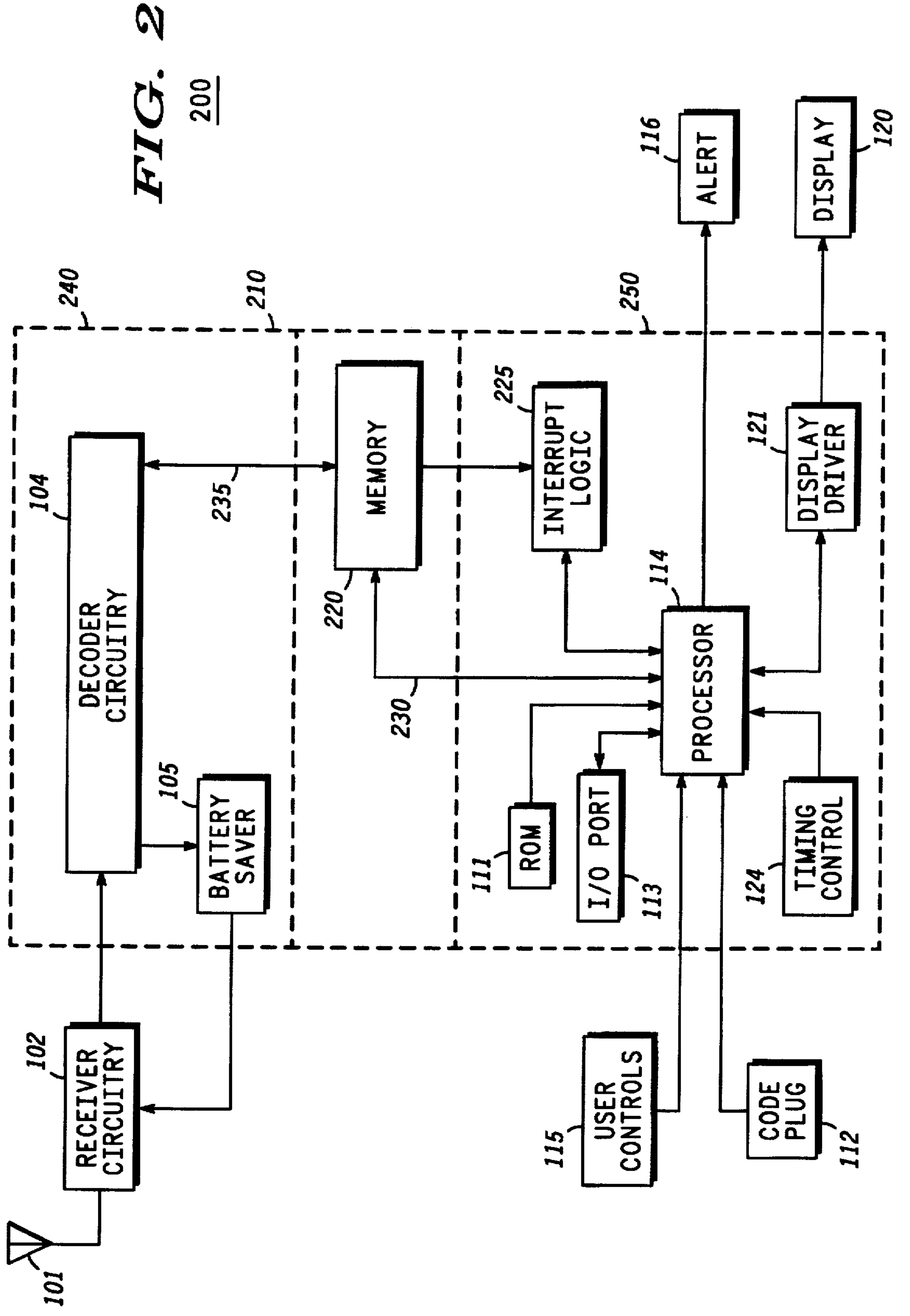
FIG. 2 illustrates a selective call receiver in accordance with a preferred embodiment of the present invention.

FIG. 2 depicts a preferred embodiment of the present invention. A selective call receiver 200 is illustrated comprising a controller 210 coupled to a receiver circuitry 102 which is coupled to receive radio frequency signals from an antenna 101, user controls 115, code plug 112, alert 116, and display 120. The controller 210 comprises three portions, decoder 240, memory 220, and microcontroller 250. The decoder 240 comprises serial decoder circuitry 104 coupled to the receiver circuitry 102 and battery saver 105. The microcontroller 250 comprises a processor 114 coupled to read only memory 111, input output port 113, the user controls 115, timing control 124, display driver 121, and the alert 116. The memory 220 is coupled to the processor 114 in the microcontroller 250 and the decoder circuitry 104 in the decoder 240 via parallel bus 230 and 235 respectively. Interrupt logic 225 is coupled to the memory 220 and the processor 114. In the preferred embodiment of the present invention, the controller 210 comprises an off the shelf decoder chip which provides the decoder circuitry 104 and the battery saver 105, and a microcontroller chip, substantially similar to that of the prior art, interfaced via the memory 220, integrated in a single semiconductor package.

Figure 3:
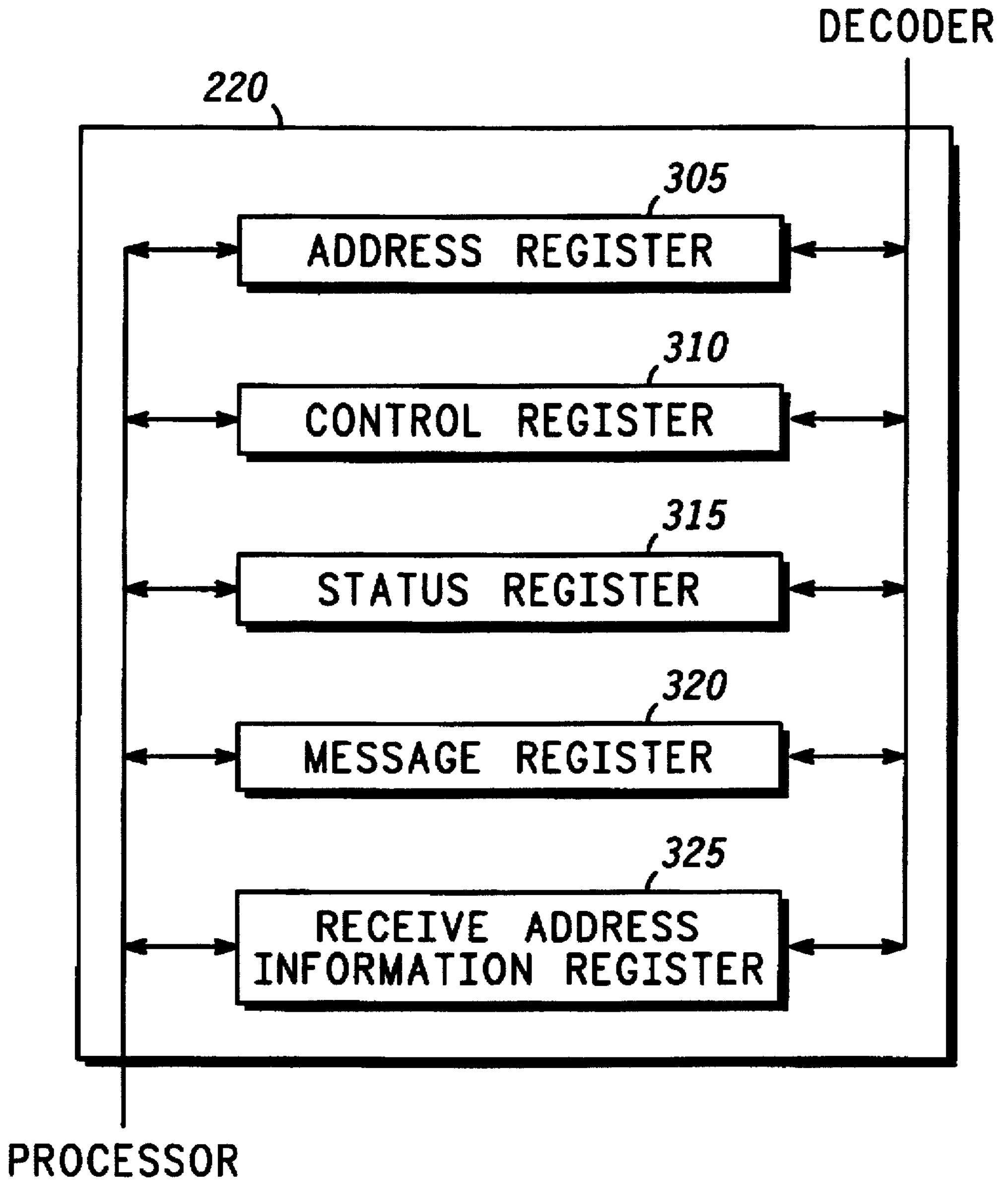
FIG. 3 illustrates a memory in the selective call receiver in FIG. 2 in accordance with the preferred embodiment of the present invention.

FIG. 3 illustrates the memory 220 comprising several registers including address register 305, control register 310, status register 315, message register 320, and receive address information register 325. In the preferred embodiment, the registers in the memory 220 are dual port registers which support simultaneous access by the decoder circuitry 104 and the processor 114. The address register 305 is for storing addresses of the selective call receiver 200 provided by the processor 114 from the code plug 112, prior to the selective call receiver 200 receiving a selective call signal, such as when the selective call receiver 200 is turned ON or reset. The control register 310 is for storing control information from the processor 114, the processor 114 retrieving the control information from the ROM 111 prior to storage in the control register 310. The decoder circuitry 104 receives and decodes a selective call signal in accordance with the control information stored in the control register 310. The status register 315 is for storing status information from the decoder circuitry 104, the processor 114 retrieving the status information to determine the status of the decoder circuitry 104 when receiving and decoding a selective call signal. The receive address information register 325 is for storing receive address information from the decoder circuitry 104, the processor 114 retrieving the receive address information in response to retrieved status information from the status register 315 indicating at least one of the addresses stored in the address register 305 is detected in the selective call signal. And the message register 320 is for storing a message from the decoder circuitry 104, the decoder circuitry 104 decoding and storing a message in the message register 320 in response to detecting, at least one of the addresses stored in the address register 305 and associated with the decoded message, in a selective call signal.

Hence, a memory coupled to a serially communicating decoder and a serially communicating microcontroller via a parallel bus, advantageously interfaces the decoder and the microcontroller, and provides faster communication that overcomes the limitations of slow serial communication of the prior art.

Figure 4:
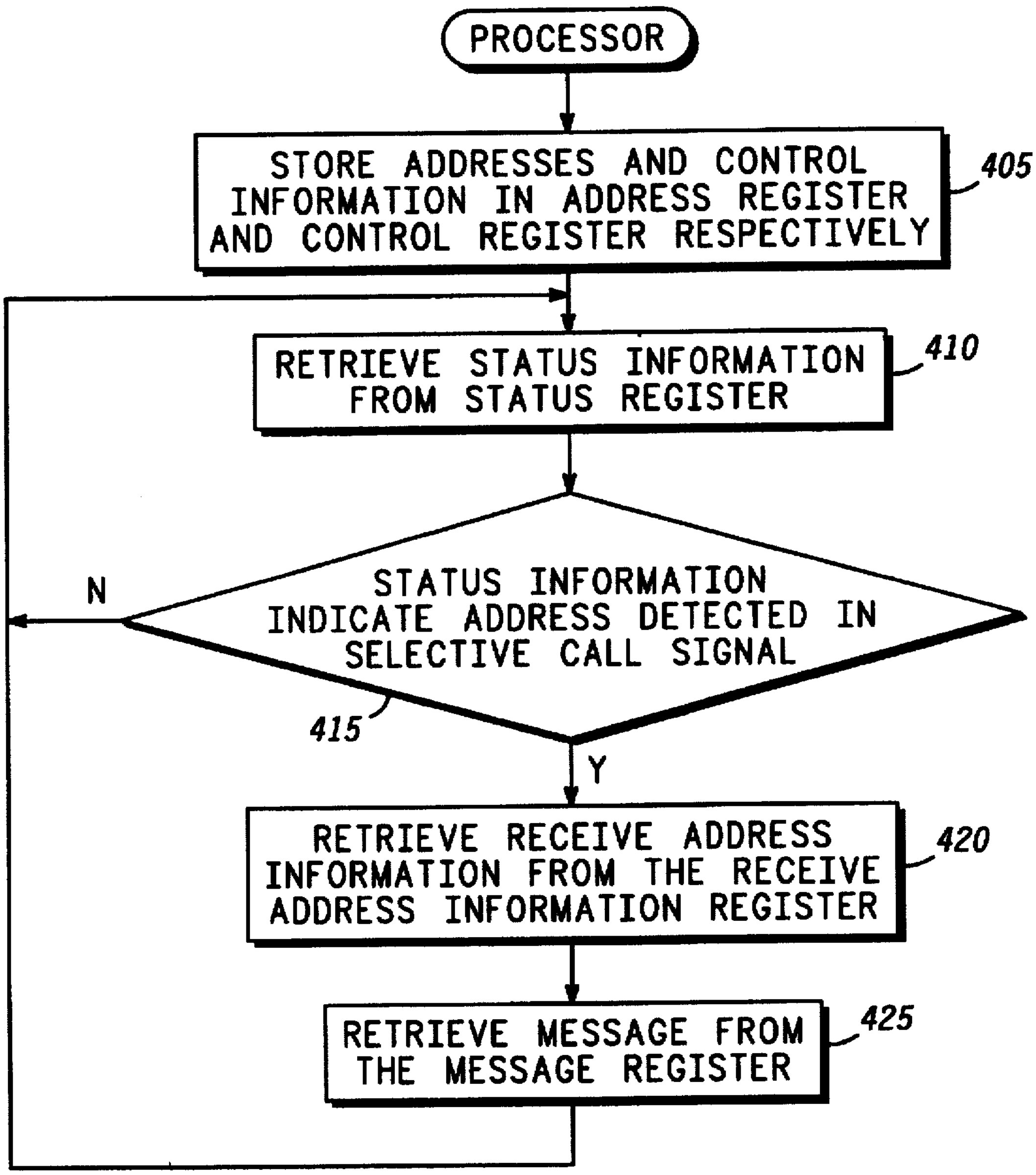
FIG. 4 illustrates a flowchart detailing the operation of the processor in FIG. 2 in accordance with the preferred embodiment of the present invention.

FIG. 4 illustrates a flow chart detailing the operation of the processor 114 in the microcontroller 250 of the controller 210. The process with the processor 114 retrieving the addresses of the selective call receiver 200 from the code plug 112, and retrieving control information from the ROM 111. The processor 114 then stores 405 the retrieved addresses in the address register 305, and the retrieved control information in the control register 310. Subsequently, the processor 114 retrieves 410 status information from the status register 315 which indicates the status of the decoder circuitry 104 when receiving and decoding a selective call in accordance with the control information stored in the control register 310. When the retrieved status information indicates at least one of the addresses stored in the address register 305 is detected in the selective call signal, the processor 114 retrieves 420 receive address information from the receive address information register 325 to determine which particular address of the addresses stored in the address register 305 is detected. The processor 114 also provides an output to the alert 116 to notify a user that a message associated with a detected address has been received and stored in the address register 305. Subsequently, the processor 114 retrieves 425 the message from the message register 320 in response to receiving an input from the user controls 115. The processor 114 providing the retrieved message to the display driver 121 for presentation by the display 120 to the user. After retrieving 425 the message from the message register 320, the processor 114 returns to retrieve 410 the status information in the status register 315 and the operation continues as described above. Also, when the retrieved status information does not indicate at least one address of the addresses stored in the address register 305 is detected in the received selective call signal, the processor 114 returns to retrieve 410 the status information in the status register 315 and the process continues as described above. In the preferred embodiment of the present invention, the interrupt logic 255 is configured to generate one or more interrupts to the processor 114 in accordance with the control information stored in the control information register 310. The processor 114 on receiving the interrupt retrieves the status information from the status register 315 and, continues processing dependent on the status information retrieved. In addition, when receiving and decoding a selective call signal the processor 114 and the decoder circuitry 104 repeatedly exchange control information and status information via the memory 220. However, as information is communicated via a parallel bus 230 and 235, the present invention advantageously communicates information faster and requires minimal processor resources for controlling the communication, freeing processor resources to provide other features and functionality to the selective call receiver.

Figure 5:
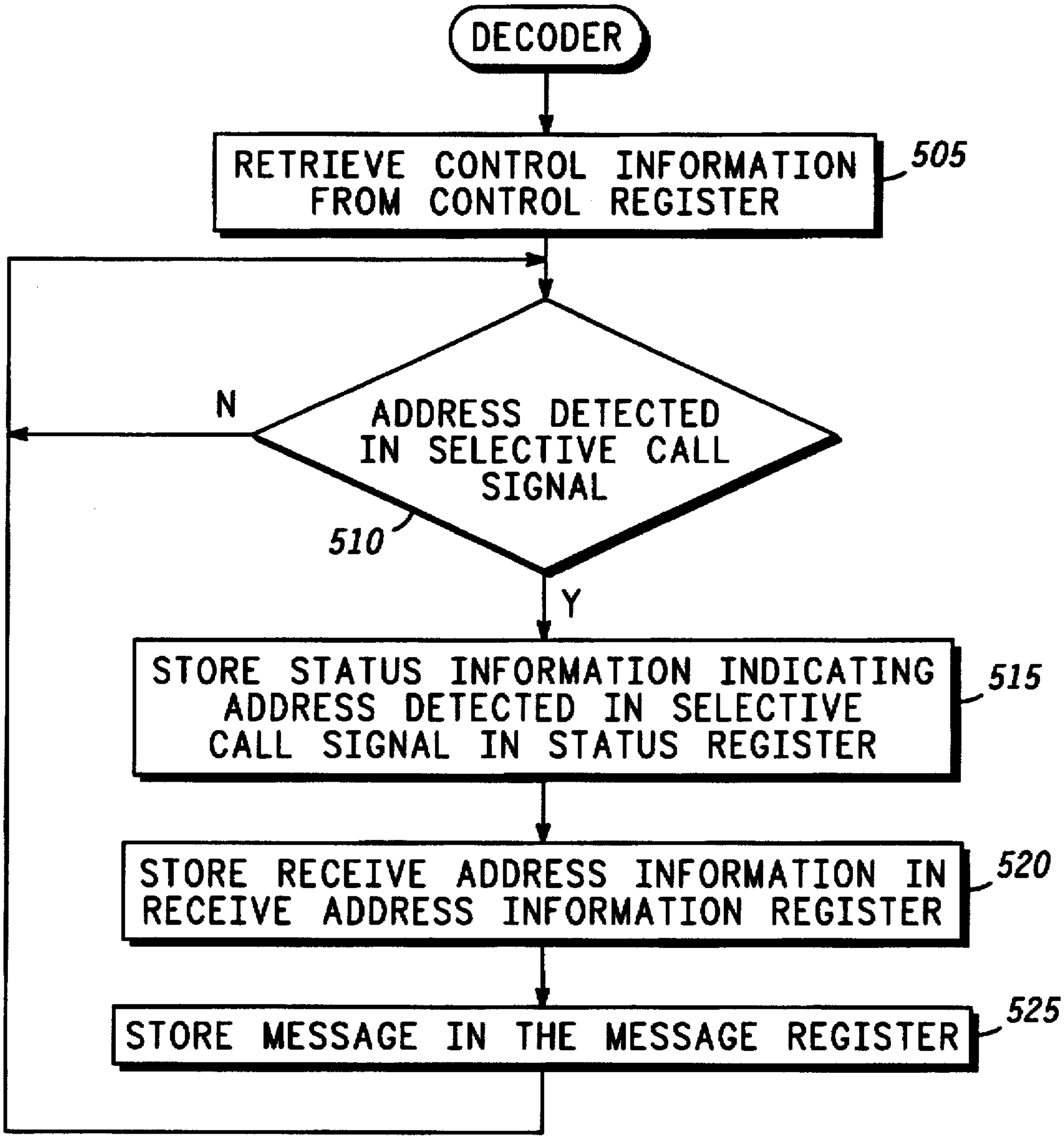
FIG. 5 illustrates a flowchart detailing the operation of the decoder circuitry in FIG. 2 in accordance with the preferred embodiment of the present invention.

FIG. 5 illustrates a flowchart detailing the operation of the decoder circuitry 104. The decoder circuitry 104 begins by retrieving 505 control information from the control register 310, the decoder circuitry 104 receiving and decoding a selective call signal from the receiver circuitry 102 in accordance with the retrieved control information. When the decoder circuitry 104 detects 510 at least one of the addresses stored in the address register 305 in a received selective call signal, the decoder circuitry 104 stores 515 status information indicating the detection in the status register 315. Note that storing the addresses in the address register 305 to facilitate detection was described above. However, when the decoder circuitry 104 does not detect 510 at least one of the addresses stored in the address register 305 in a received selective call signal, the decoder circuitry 104 returns to detecting addresses when receiving and decoding subsequent selective call signals. After the step of detection 510 and storage 515, the decoder circuitry 104 stores 520 receive address information in the receive address information register 325 indicating the particular address of the addresses stored in the address register 305 which has been detected in the received selective call signal. Consequent to detection, the decoder circuitry 104 stores 525 a message decoded from the received selective call signal and associated with the detected address, in the message register 320, prior to returning to detecting addresses when receiving and decoding subsequent selective call signals.

In accordance with the present invention, a serial selective call decoder and a serial microcontroller, both readily available on the open market, may be advantageously integrated into a single semiconductor package providing an economical and compact controller for use in a selective call receiver. This is achieved by coupling the decoder and the microcontroller to a plurality of dual port registers using a parallel bus. With parallel communication, information between the decoder, the memory and the microcontroller is advantageously communicated at a higher speed than with the serial communication of the prior art, thereby overcoming the limitations thereof. In addition, as the present invention uses a commercially available decoder and microcontroller, both with market proven levels of quality and reliability, the present invention provides a controller for a selective call receiver having substantially similar levels of quality and reliability. Further, the present invention results in a controller in a single package that can be economically, conveniently, and reliably included by selective call receiver manufacturers in their selective call receivers.

Hence, the present invention integrates a decoder and a microcontroller in a single semiconductor package, which provides input and output microcontroller pins for added functionality in a selective call receiver, reduces response time to incoming messages, does not require a large amount of memory, and does not require duplicate circuitry in the decoder and the microcontroller.

What is claimed is:

1. A controller for a selective call receiver having a plurality of addresses, and wherein the selective call receiver receives a selective call signal having one of the plurality of addresses and a message, the controller comprising:

a microcontroller having a parallel port for providing control information and the plurality of addresses, and for retrieving status information, receive address information and the message;

a memory having a first parallel port coupled to the parallel port of the microcontroller for storing the control information and the plurality of addresses from the microcontroller, and having a second parallel port, different from the first parallel port, for receiving the status information, the receive address information, and the message, and for storing the status information, the receive address information, and the message; and a dedicated decoder having a parallel port coupled to the second parallel port of the memory for retrieving the control information and the plurality of addresses from the memory, having an input for coupling to a receiver and for receiving the selective call signal therefrom, the dedicated decoder for decoding the selective call signal in accordance with the control information in response to receiving the selective call signal, for storing the status information in the memory when receiving and decoding the selective call signal, and the dedicated decoder for storing the receive address information in the memory in response to detecting the one of the plurality of addresses in the selective call signal, and for decoding and storing the message in the memory.

2. The memory in claim 1 comprising a plurality of registers simultaneously accessible by the microcontroller and the decoder.

3. The plurality of registers in claim 2 comprising:

a control register for storing the control information;

an address register for storing the plurality of addresses;

a status register for storing the status information;

a receive address information register for storing the receive address information; and a message register for storing the message.

4. The plurality of registers in claim 2 comprising a plurality of dual pond registers.

5. The controller in claim 1 wherein the decoder, the microcontroller and the memory are coupled to a parallel communication bus for communicating the plurality of addresses, the control information, the status information, the receive address information and the message.

6. The controller in claim 1 further comprising interrupt logic for receiving predetermined inputs from the memory, and for transmitting an interrupt to the microcontroller when the predetermined inputs are received.

7. The microcontroller in claim 1 further comprising:

a read only memory for storing predetermined instructions that determine the operation of the microcontroller;

a processor coupled to the read only memory for executing the predetermined instructions;

input-output ports coupled to the processor for operably coupling the processor to other circuitry;

user controls coupled to the processor for providing user input to the processor;

a code plug coupled to the processor for non-volatile storage of the plurality of addresses;

timing control coupled to the processor for providing timing signals to the processor;

a display driver coupled to the processor for receiving information from the processor and providing the information to a display for presentation to a user;

an output to an alert for alerting a user when the message is stored in the message register of the memory.

8. The decoder in claim 1 comprising:

decoder circuitry for retrieving the control information from the memory, for receiving and decoding the selective call signal in accordance with the control information in response to receiving the selective call signal from receiver circuitry, for storing the status information in the memory when receiving and decoding the selective call signal, for storing the receive address information in the memory in response to detecting the one of the plurality of addresses in the selective call signal, and for decoding and storing the message in the memory; and a battery saver for receiving input from the decoder circuitry and in response providing an output to the receiver circuitry causing the receiver circuitry to reduce current drain.

9. An apparatus for coupling to a dedicated decoder and a microcontroller in a selective call receiver having a plurality of addresses, the selective call receiver receiving a selective call signal having one of the plurality of addresses and a message, the apparatus comprising:

a first parallel port for coupling to the microcontroller;

a second parallel port, different from the first parallel port, for coupling to the dedicated decoder;

a plurality of address registers coupled to the first and second parallel ports for storing the plurality of addresses of the selective call receiver prior to the decoder receiving the selective call signal;

a plurality of control registers coupled to the first and second parallel ports for storing control information from the microcontroller, the decoder receiving and decoding the selective call signal in accordance with the control information after retrieval thereof;

at least one status register coupled to the first and second parallel ports for storing status information from the decoder, the microcontroller retrieving the status information to determine the status of the decoder when receiving and decoding the selective call signal;

at least one receive address information register coupled to the first and second parallel ports for storing the receive address information from the decoder, the microcontroller retrieving the receive address information in response to the retrieved status information indicating one of the plurality of addresses is detected in the selective call signal; and a message register coupled to the first and second parallel ports for storing a message from the decoder, the microcontroller retrieving the message in response to receiving a user input for the stored message to be presented.

10. The apparatus in claim 9 further comprising interrupt logic for receiving predetermined inputs from the plurality of registers in claim 9, and for transmitting an interrupt to the microcontroller when the predetermined inputs are received.

11. The plurality of registers in claim 9 comprising dual port registers for simultaneous access by the dedicated decoder via the second parallel port and the microcontroller via the second parallel port.

12. A method in a processor for interfacing to a dedicated decoder in a selective call receiver having a plurality of addresses, wherein the dedicated decoder and the processor are coupled to a memory, and wherein the dedicated decoder decodes a selective call signal received by the selective call receiver, and wherein the processor controls the operation of the dedicated decoder to decode the selective call signal, the method comprising the steps of:

a) storing the plurality of addresses of the selective call receiver and control information in the memory;

b) retrieving status information from the memory;

c) retrieving receive address information from the memory in response to the retrieved status information indicating one of the plurality of addresses is detected by the dedicated decoder when receiving and decoding the selective call signal in accordance with the control information; and d) retrieving a message from the memory in response to receiving a user input for the message to be presented.

13. A method in a dedicated decoder for interfacing to a processor in a selective call receiver having a plurality of addresses, wherein the dedicated decoder and the processor are coupled to a memory, and wherein the dedicated decoder decodes a selective call signal received by the selective call receiver, and wherein the processor controls the operation of the dedicated decoder to decode the selective call signal, the method comprising the steps of:

a) retrieving control information from the memory;

b) storing status information in the memory when receiving and decoding the selective call signal in accordance with the retrieved control information;

c) storing receive address information in the memory in response to detecting one of the plurality of addresses stored in the memory in the decoded selective call signal; and d) storing a message in the memory in response to decoding the message associated with the detected one of the plurality of addresses in the selective call signal.

* * * * *

UNITED STATES PATENT AND TRADEMARK OFFICE

CERTIFICATE OF CORRECTION

PATENT NO. : 5,701,414

DATED : December 23, 1997

INVENTOR(S) : Cheng et al.

It is certified that error appears in the above-identified patent and that said Letters Patent is hereby corrected as shown below:

In column 7, claim 4, line 47, delete “pond” and replace with --port--.

Signed and Sealed this

Thirty-first Day of August, 1999

Attest:

Q. TODD DICKINSON

*Attesting Officer* *Acting Commissioner of Patents and Trademarks*